May 26, 1970
A. D. CLARK
3,514,573
METHOD OF ASSEMBLING AN ELECTRICALLY CONDUCTIVE MEMBER
TO AN ELECTRICALLY NON-CONDUCTING MEMBER
Filed Dec. 20, 1967
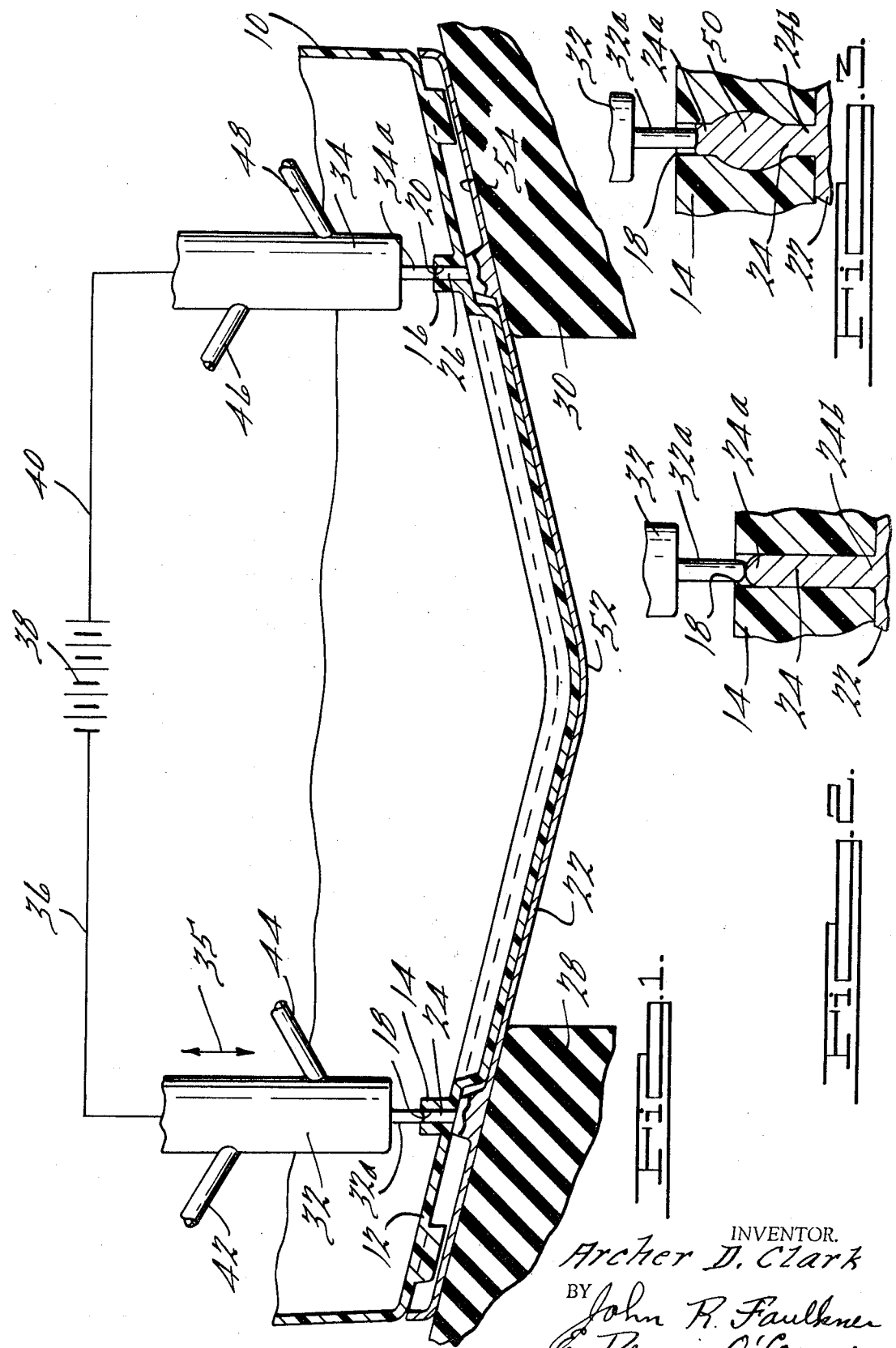
INVENTOR.
Archer D. Clark
BY John R. Faulkner
E. Dennis O'Connor
ATTORNEYS.

United States Patent Office 3,514,573
Patented May 26, 1970

3,514,573
METHOD OF ASSEMBLING AN ELECTRICALLY CONDUCTIVE MEMBER TO AN ELECTRICALLY NON-CONDUCTING MEMBER
Archer D. Clark, Dearborn, Mich., assignor to Ford Motor Company, Dearborn, Mich., a corporation of Delaware
Filed Dec. 20, 1967, Ser. No. 692,242
Int. Cl. B21j 5/08; H05b 1/00
U.S. Cl. 219—150     8 Claims

ABSTRACT OF THE DISCLOSURE

A method of assembling an electrically non-conductive member to an electrically conductive member. A pair of projections on the latter are inserted in holes formed through the former. An electrical contact is brought into intimate engagement with the outer extremities of each of the projections so that current flows from one projection to the other through the body of the conductive member and heats the projections to the plastic state due to electrical resistance. The contacts are forced against the outer ends of the projections to deform the projections radially outward relative to their axes to secure the members together.

BACKGROUND OF THE INVENTION

The increased use in manufacturing of plastics and other synthetic, electrically non-conductive materials often necessitates the assembly of a part formed from such material to a part formed from an electrically conductive material such as metal. Assemblies of this type are common in the automotive manufacturing field as exemplified by the assembly of a metal decorative member having a bright surface to a plastic vehicle running light lens.

Conventionally, such an assembly is accomplished by forming threaded projections on the metal member that are adapted to extend through holes in the plastic member and engage threaded nuts to hold the parts together. Such an assembly is relatively costly in terms of labor and parts as well as mitigating high speed production.

It also is known to accomplish such as assembly by forming a projection on the metal member that is heated, extended through a hole formed in the body of the plastic member, and hot staked to enlarge the end of the projection that extends through the hole, thus preventing the projection from "backing out" of the hole. A drawback to such an assembly is that the connection may not remain secure when subjected to extremes of heat and cold. Also, the low melting point of plastic necessitates heating of the projection remote from the plastic member by distinct heating means and excessive handling of the parts.

It is an object of my invention to provide a method of joining an electrically conductive member and an electrically non-conductive member wherein the need for fasteners is eliminated since the connection is accomplished by material deformation. The assembly connection can be made using modern high speed manufacturing equipment and remains secure despite exposure to extreme atmospheric conditions. Also, portions of the surface of the metal member having a preformed and critical surface finish are not marred during the performance of the method of assembly of this invention.

DESCRIPTION OF THE DRAWING

FIG. 1 is an elevation view, partially in section, illustrating the electrically conductive and non-conductive members to be assembled according to the method of this invention just prior to the connection thereof;

FIG. 2 is an illustrated view of a portion of FIG. 1 illustrating in greater detail the area of connection; and FIG. 3 is a view similar to FIG. 2 but illustrating the structure of FIG. 2 just subsequent to the connection having been made.

DETAILED DESCRIPTION OF THE INVENTION

The method of assembling an electrically conductive member to an electrically non-conductive member according to this invention best can be appreciated by reference to the accompanying drawing wherein an electrically non-conductive element such as the lens of a motor vehicle running light is designated by the reference numeral 10. Extending from one surface 12 of lens 10 are a pair of bosses 14 and 16. Central holes 24 and 26 have been formed through bosses 14 and 16, respectively, and the body of lens 10.

An electrically conductive member such as a die cast, decorative metal member 32 has extending from one surface 54 thereof a pair of generally cylindrical prongs or projections 24 and 26. Projections 24 and 26 are sized and spaced such that projection 24 is receivable within hole 18 while projection 26 is receivable simultaneously in hole 20 as illustrated in FIG. 1. In this orientation, lower surface 52 of metal member 22 is supported by elements 28 and 30 of a jig to secure lens 10 and member 22 against relative movement during subsequent operations A pair of electrically conductive tools 32 and 34 are secured together in a manner not illustrated for reciprocal movement in the direction of the arrows 35. Integrally formed with tools 34 and 36 are tool noses 32a and 34a, respectively. Tool noses 32a and 34a are shaped such that they are receivable in holes 18 and 20, respectively.

An electrically conductive lead 36 connects tool 32 to the negative terminal of a source of electrical current such as battery 38. The positive terminal of the battery is connected by an electrically conductive lead 40 to tool 34.

Tools 32 and 34 are of hollow construction so that a coolant such as water may be circulated through these tools. Inlet pipe 42 and outlet pipe 44 provide for coolant flow through tool 32 and a similar coolant flow through tool 34 is provided by pipes 46 and 48.

With lens 10 and metal member 22 positioned as illustrated in FIG. 1, tools 32 and 34 are brought simultaneously into intimate contact with the upper extremities of projections 24 and 26. It readily may be appreciated that such contact of the tools with the projections formed on conductive member 22 completes an electrical circuit whereby current from battery 38 flows through the body of metal member 24 between projections 24 and 26. This current flow, due to the electrical resistance of the material forming projections 24 and 26, causes a portion of the material of these projections to be heated to the plastic state. Heating of metal member 22 will be greatest at projections 24 and 26 because of the relatively small cross sectional area of these projections and the contact point between these projections and the tools 32 and 34. Movement of tools 32 and 34 downward against projections 24 and 26 is continued and is made possible by the deformation of the projections as will be explained in detail below.

FIGS. 2 and 3 show an enlarged illustration of projection 24 prior and subsequent to deformation of this projection. As electrical current from battery 38 flows through tool 32, tool nose 32a and projection 24, the upper end 24a of projection 24, due to its proximity to the contact point with tool nose 32a, has a tendency to be heated at a higher rate than other portions of projection 24. This tendency is suppressed due to cooling of projection end 24a due to its contact with the water cooled tool nose 32a. The end 24b of projection 24 that is remote from end 24a has a natural resistance to heating due to its proximity to the main body metal member 22.

The mass of metal forming the body of member 22 acts as a heat sink to effectively cool projection end 24b. It thus may be appreciated that the portion of projection 24 that first will reach the plastic state due to heating by electrical resistance is that portion of projection 24 located between ends 24a and 24b.

As the projection becomes heated, heat transfer to the surrounding plastic material of boss 14 causes this material to become softened. As tool nose 32a is forced into hole 18 against the upper extremity of projection 24, exerting axial forces along the length of the projection, material about the midpoint of the projection will be displaced radially outward as at 50 in FIG. 3, and will in turn displace plastic material of boss 14 to interlock projection 24 and boss 14. The connection illustrated in FIG. 3 prevents relative movement of projection 24 and boss 14 either upwards or downwards as viewed and thus insures that this connection will remain fast despite temperature extremes that may cause expansion and contraction of the parts.

It also may be noted from FIG. 2 that the length of projection 24 is less than the length of hole 18 so that the upper portion of hole 18 not occupied by projection 24 acts as a locating means and aids in positioning tool nose 32a in contact with the upper extremity of projection 24.

It has been found that the electrical resistance heating of the conductive projections to the plastic state occurs almost instantaneously upon the flow of current through these members. For this reason, a single downward movement of the tools to contact and deform the projections is possible and desirable for high speed performance of the method of this invention. The precise current value most advantageous for projections of a particular material and size easily may be determined empirically by one having ordinary skill in the art.

Although the surface 52 of metal member 22 that is remote from lens 10 does have a critical finish, having chromium or other bright material plated thereon, the surface 54 does not have a critical surface finish. It thus is possible to assemble a non-conductive element such as lens 10, having but a single hole extending therethrough to a conductive member such as metal member 22 having but a single projection extending therefrom and utilizing but a single electrically conducting tool. For such an assembly, the electrical circuit causing current flow through the tool, projection and metal member may be completed by bringing an electrical contact, charged oppositely from the tool, into contact with the surface of the metal member having a non-critical surface finish. An electrical contact may not be brought into engagement with the surface of a metal member having a critical surface finish, however, since arcing between the contact and the surface would mar this finish.

It thus may be seen that the method of this invention provides for the assembly of an electrically conductive member to an electrically non-conductive member wherein the need for threaded fasteners is eliminated. Furthermore, assembly according to the method of this invention may be accomplished at high speed yielding volume production of assembled parts with a minimum of labor and handling of parts.

What is claimed is:

1. A method of assembling an electrically non-conductive member and an electrically conductive member, the latter including a first surface portion having a critical surface finish and a second surface portion having a non-critical surface finish, said method including the steps of: forming a hole through said non-conductive member, forming a projection on said conductive member receivable in said hole, said projection having a length less than the length of said hole, arranging said members such that said projection extends partially into said hole, contacting the extremity of said projection with a first electrical contact sized to be received in said hole and extending into said hole from the end thereof remote from said projection, contacting said second surface portion of said conductive member with a second electrical contact, electrically connecting said contacts to oppositely charged terminals of a source of current such that current flows from one of said contacts to the other through said projection and the body of said conductive member and said projection becomes heated due to electrical resistance, deforming said projection by exerting a force against the extremity of said projection with said first contact.

2. The method of claim 1, wherein said conductive member is a die casting and said first surface portion has a bright material plated thereon.

3. The method of claim 1, wherein said projection has a cross section that is essentially circular, said projection being shortened and material of said projection deformed radially outward during deformation.

4. The method of claim 1, including the step of effectively cooling the end portions of the projection during current flow such that deformation of the projection occurs between the ends thereof.

5. A method of assembling an electrically conductive member and an electrically non-conductive member including the steps of: forming a pair of holes through said non-conductive member; forming a pair of prongs on said conductive member, said prongs being spaced and sized to be simultaneously receivable in said holes; arranging said members such that each one of said prongs extends into one of said holes, the length of each one of said holes being greater than the length of the prong received therein; securing said members against relative movement; contacting the extremity of each of said prongs with one of a pair of electrically conductive tools, said tools being sized to be received in said holes; electrically connecting said tools to oppositely charged terminals of a source of electrical current whereby current flows through said conductive member from one prong to the other causing said prongs to become heated due to electrical resistance; and hot upsetting a portion of each of said prongs located within one of said holes by forcing said tools against the extremities of said prongs and exerting forces along the axes of said prongs.

6. The method of claim 5, wherein the material of said non-conductive member adjacent said prongs is heated during current flow through said prongs due to the proximity of said material to said prongs, at least a portion of said material being displaced during the hot upsetting of said prongs.

7. The method of claim 5, wherein said prongs are heated by electrical resistance such that a portion of the material of said prongs is in the plastic state.

8. The method of claim 5, including the step of cooling the portions of said prongs proximate to said tools during current flow, the portions of said prongs proximate the body of said conductive member having a resistance to heating due to the heat sink characteristics of the body of said conductive member, whereby deformation of said prongs due to upsetting occurs midway along the lengths of said prongs.

References Cited

UNITED STATES PATENTS 1,329,144   1/1920   Rypinski _____ 219—150.5

JOSEPH V. TRUHE, Primary Examiner

L. A. ROUSE, Assistant Examiner

U.S. Cl. X.R.

29—509, 522